(12) United States Patent
Rysenga et al.

(10) Patent No.: US 8,428,569 B2
(45) Date of Patent: Apr. 23, 2013

(54) MDN SWITCHING BETWEEN TELEMATICS DEVICES

(75) Inventors: Jeffrey P. Rysenga, Berkley, MI (US); Dennis M. Bodrie, Plymouth, MI (US); William E. Italia, Howell, MI (US)

(73) Assignee: General Motors LLC, Detroit, MI (US)

( * ) Notice: Subject to any disclaimer, the term of this patent is extended or adjusted under 35 U.S.C. 154(b) by 1248 days.

(21) Appl. No.: 11/967,983

(22) Filed: Dec. 31, 2007

(65) Prior Publication Data

US 2009/0170491 A1   Jul. 2, 2009

(51) Int. Cl.
*H04M 3/00* (2006.01)
(52) U.S. Cl.
USPC .............. 455/418; 455/414.1; 455/456.1; 705/1.1

(58) Field of Classification Search .......... 455/418, 455/414.1, 456.1; 705/1.1
See application file for complete search history.

(56) References Cited

U.S. PATENT DOCUMENTS

| | | | |
|---|---|---|---|
| 7,894,795 B1* | 2/2011 | Dunne et al. | 455/406 |
| 2006/0217109 A1* | 9/2006 | Sobb et al. | 455/414.1 |
| 2007/0254639 A1* | 11/2007 | Chmielewski et al. | 455/419 |
| 2008/0120124 A1* | 5/2008 | Zoeckler et al. | 705/1 |

* cited by examiner

*Primary Examiner* — Amancio Gonzalez
(74) *Attorney, Agent, or Firm* — Leydig, Voit & Mayer, Ltd.

(57) ABSTRACT

Aspects of the present invention provide for a telematics subscriber and provider to facilitate a wireless carrier to associate a cellular telephone number from a subscriber's previous telematics unit to a subscriber's newly purchased telematics unit. In addition, the telematics provider reconfigures a new telematics device in a newly purchased vehicle to retain the same cellular phone number as the subscriber's previous telematics device.

14 Claims, 5 Drawing Sheets

MDN SWITCHING BETWEEN TELEMATICS DEVICES

BACKGROUND OF THE INVENTION

One of the fastest growing areas of communications technology is related to automobile network solutions. Almost all new American cars will come equipped with some level of telematics service, and with the increasing number and variety of these services, demands on telematics service call centers have also grown. Consequently, vehicle owners (i.e. telematics subscribers) may sell their old telematics equipped vehicles to buy new telematics equipped vehicles.

A telematics unit installed in a vehicle contains a cellular device to allow a telematics subscriber to communicate across a wireless network. Telematics subscribers and providers would like the subscriber's telematics cellular number to remain unchanged when buying a new vehicle with a different telematics unit.

BRIEF SUMMARY OF THE INVENTION

Aspects of the present invention provide for a telematics subscriber and provider to facilitate a wireless carrier to associate a cellular telephone number from a subscriber's previous telematics unit to a subscriber's newly purchased telematics unit. In addition, the telematics provider reconfigures a new telematics device in a newly purchased vehicle to retain the same cellular phone number as the subscriber's previous telematics device.

BRIEF DESCRIPTION OF THE SEVERAL VIEWS OF THE DRAWING(S)

DETAILED DESCRIPTION OF THE INVENTION

Before describing the invention in detail, an exemplary environment in which the invention may operate will be described. It will be appreciated that the described environment is for purposes of illustration only, and does not imply any limitation regarding the use of other environments to practice the invention.

Figure 1:
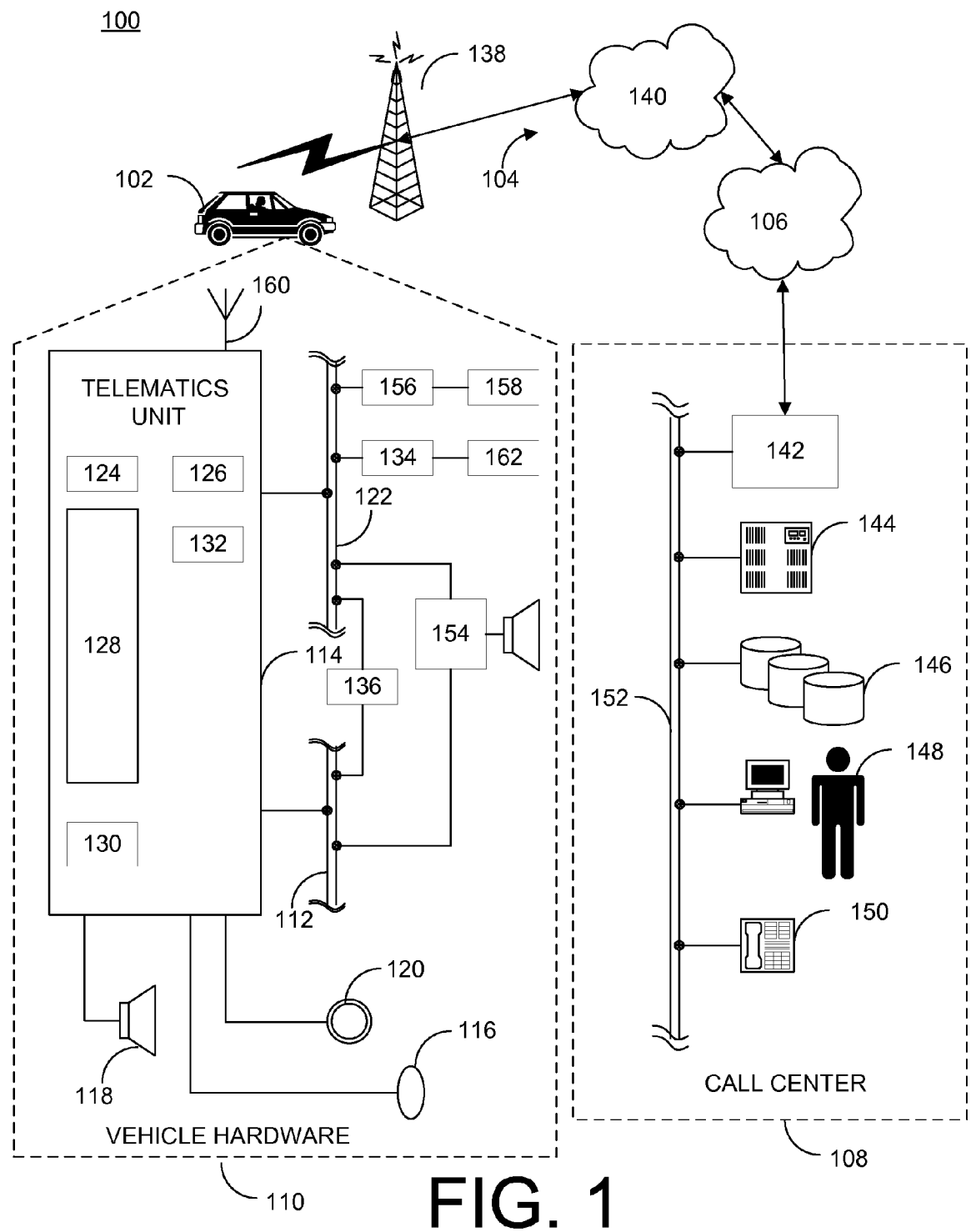
FIG. 1 is a schematic view of an example communication system within which examples of the disclosed system may be implemented.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
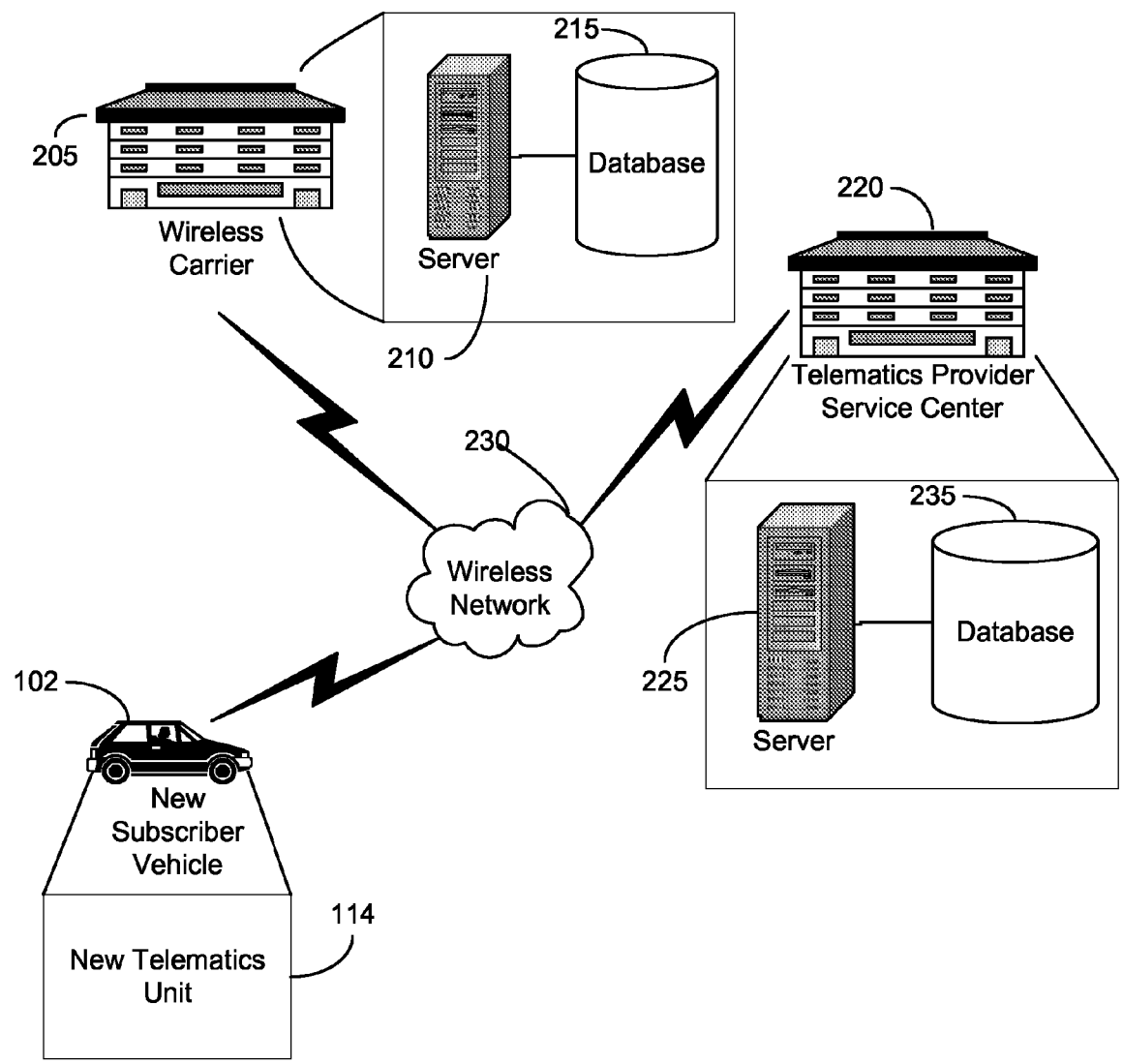
FIG. 2 is a general overview of system architecture in keeping with the disclosed principles.

FIG. 2 is a general overview of system architecture that includes a newly purchased subscriber vehicle 102, wireless carrier 205, and telematics provider center 220 connected across a wireless network 230. The new subscriber vehicle 102 contains a subscriber's new telematics unit 114. The wireless carrier 205 contains a plurality of servers 210 and a plurality of databases 215. These databases contain records and billing information for the cellular device in the new telematics unit 114. The telematics service provider center 220 contains a plurality of servers 225 and a plurality of databases 235 that contain record information for the new telematics device 114.

Figure 3:
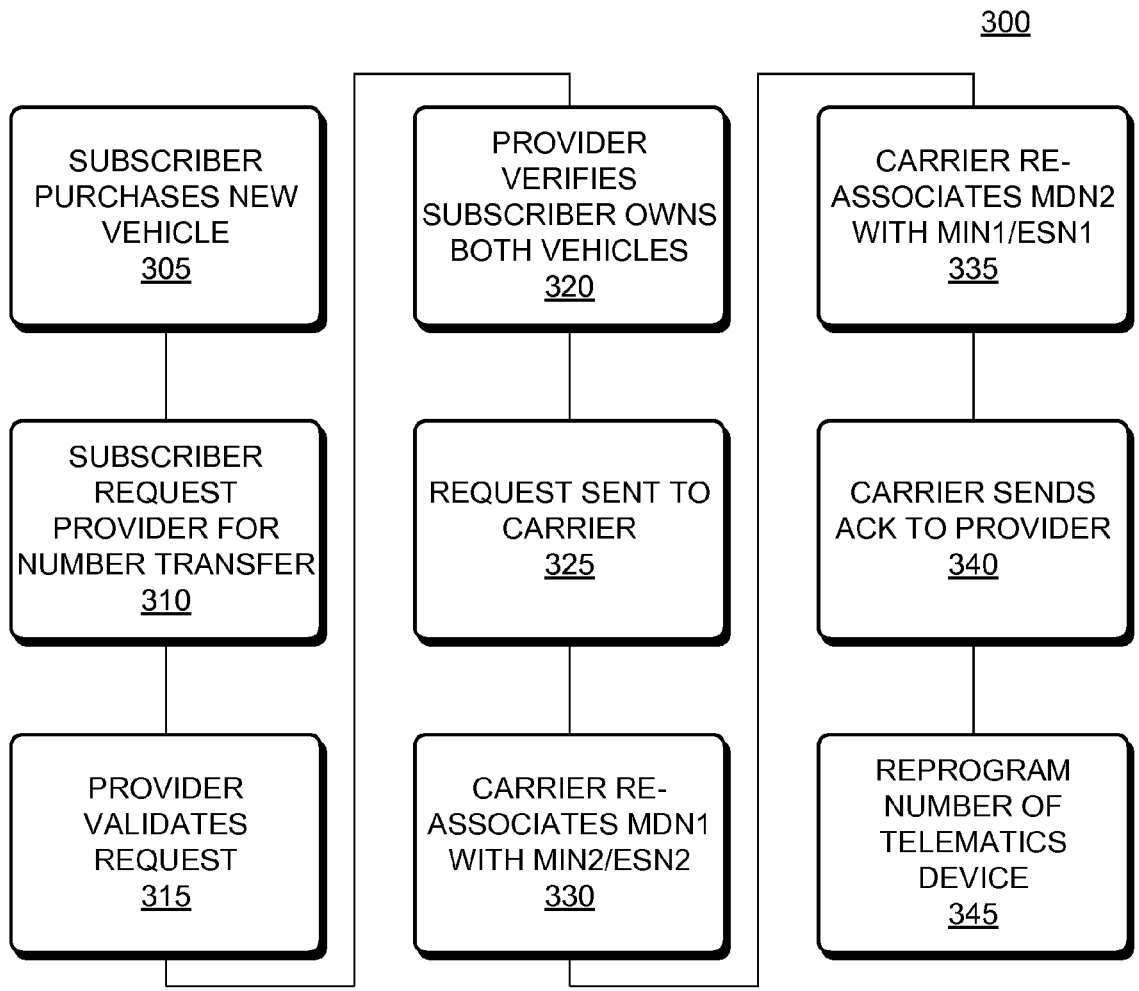
FIG. 3 is a flow diagram that illustrates an exemplary method of MDN switching between telematics devices.

FIG. 3 is a flow diagram that illustrates an exemplary method of MDN switching between telematics devices. At a stage 305, a subscriber purchases a new vehicle equipped with a new telematics device. At a next stage 310, a subscriber requests a telematics service provider to transfer the cellular number of the subscriber's previously owned telematics device to the newly purchased telematics device. At a next stage 315, the telematics provider validates the request by confirming that the subscriber has purchased a new telematics equipped vehicle. For example, the provider may validate the purchase with the vehicle dealer. At a next stage, 320, a telematics provider verifies that the subscriber owned the previous telematics equipped vehicle and the new telematics equipped vehicle. For example, a provider may have one or more servers examine the subscriber's records in one or more databases. Once verification is accomplished, at a next stage 325, the telematics provider requests the wireless carrier to re-associate the cellular number of the new telematics device to the cellular number of the old telematics device. The cellular phone within the telematics unit contains several parameters. These include the mobile directory number (MDN), the mobile identification number (MIN), and the electronic serial number (ESN). The MDN is the cellular number associated with a cellular phone. The MIN is a 10 digit unique number that a wireless carrier uses to identify the cellular phone. The ESN is a non-configurable 32-bit number that is used by the carrier to activate a cellular phone. At a next stage 330, a wireless carrier re-associates the cellular number of the subscriber's previously owned telematics unit (MDN1) with the MIN and ESN of the newly purchased telematics unit (MIN2 and ESN2). At a next stage 335, a wireless carrier may re-associate the cellular number of the new telematics unit (MDN2) with the previously owned telematics unit MIN and ESN (MIN1 and ESN1). At a next stage 340, the wireless carrier sends an acknowledgement to the telematics provider confirming the cellular number of the previously owned telematics device is associated with the subscriber's newly purchased telematics unit. At a next stage 345, the telematics service provider reprograms the number of the newly purchased telematics device across a wireless network and modifies its records accordingly.

Figure 4:
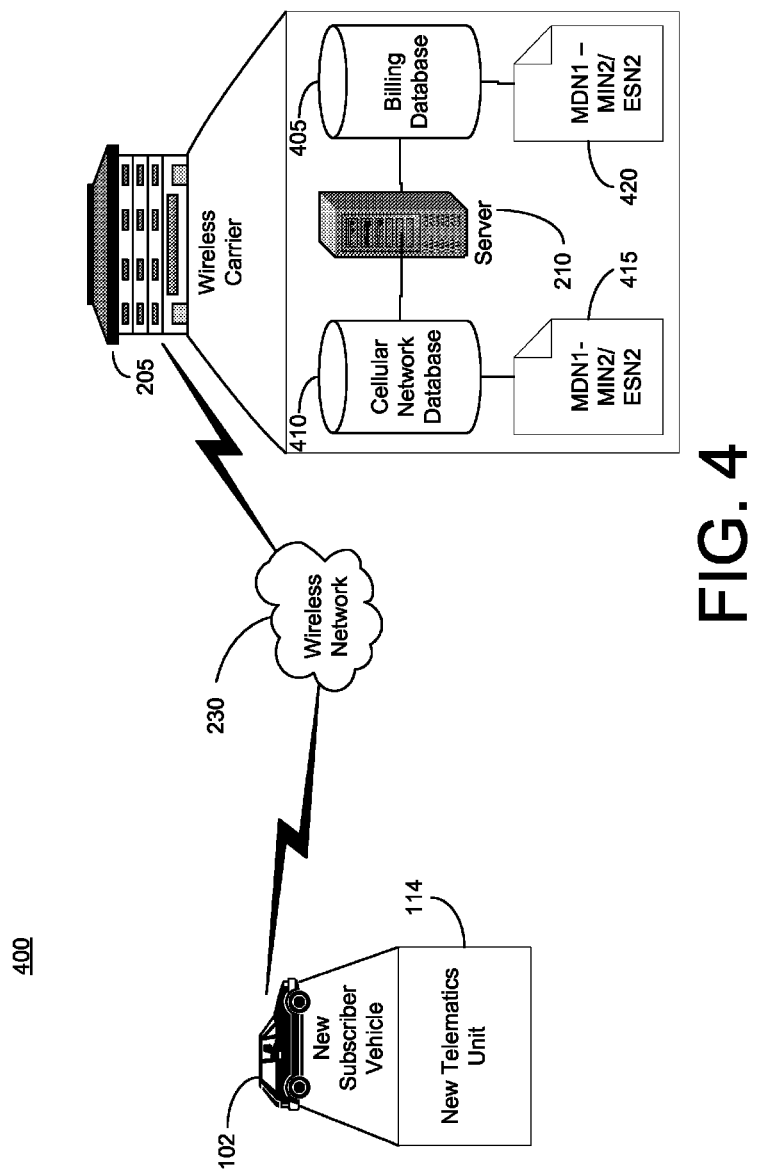
FIG. 4 is another a general overview of system architecture in keeping with the disclosed principles.

FIG. 4 is another general overview of system architecture that illustrates aspects of the invention. A newly purchased subscriber vehicle 102 equipped with a new telematics unit 114 communicates with a wireless carrier 205 across a wireless network 230. When a telematics service provider requests a wireless carrier 205 to re-associate the cellular number of the subscriber's previously owned telematics device to the newly purchased telematics device, the wireless carrier may implement the following. A carrier server searches one or more databases to examine and modify the newly purchased telematics unit's cellular records. These include examining and modifying a cellular network database 410 and a billing database 405. A cellular network database records an MDN with a MIN/ESN pair for all cellular devices in the wireless carrier's network. When complying with the telematics provider's request, a wireless carrier re-associates the MDN for the previously owned telematics unit with the MIN/ESN of the newly purchased telematics unit 415. A billing database 420, associates a MDN with a MIN/ESN pair for billing purposes. Similarly, a wireless carrier 205, may modify its billing database 405 such that the cellular number (MDN) of the previously owned telematics unit is associated with the MIN/ESN of the newly purchased telematics unit 420.

Figure 5:
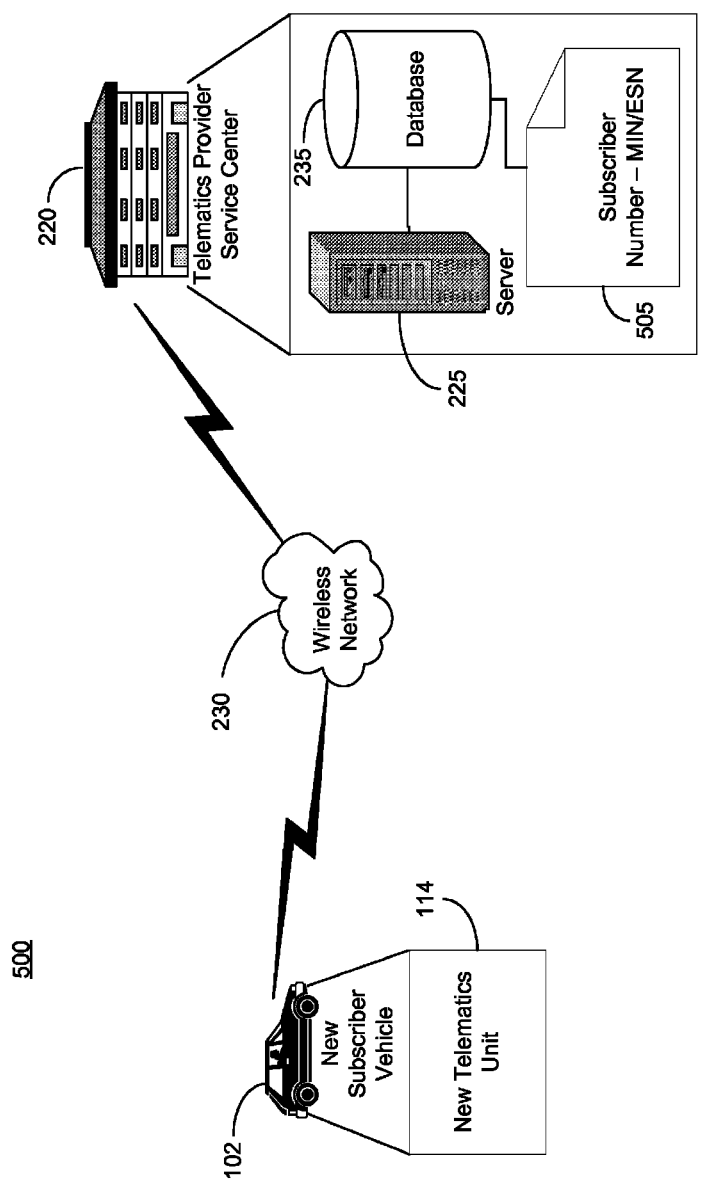
FIG. 5 is another general overview of system architecture in keeping with the disclosed principles.

FIG. 5 is another general overview of system architecture illustrating aspects of the invention. A newly purchased subscriber vehicle 102 equipped with a new telematics unit 114 communicates with a telematics service provider center 220 across a wireless network 230. A telematics service center may contain a plurality of servers 225 and a plurality of databases 235. A provider may reprogram the new telematics unit with the cellular number of the subscriber's previously owned telematics unit across a wireless network 230 using one or more software applications implemented by one or more servers 225. The telematics service provider center 220 communicates with the telematics unit 114 across the wireless network 230 and reconfigures the MDN of the newly purchased telematics unit (MDN2) with the cellular number of the subscriber's previously owned telematics unit. In addition, the telematics service provider center edits its database records such that the subscriber's number is associated with the newly purchased telematics unit's MIN/ESN instead of the previously owned telematics unit's MIN/ESN 505.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for switching Mobile Directory Numbers (MDNs) of a acquired telematics unit and a previously registered telematics unit, the method comprising:
    requesting a telematics service provider to transfer an MDN from a subscriber's previously registered telematics unit to a subscriber's acquired telematics unit;
    verifying that the subscriber is an authorized user for both the previously registered telematics unit and the acquired telematics unit;
    requesting a wireless carrier to transfer the MDN from a subscriber's previously registered telematics unit to the acquired telematics unit;
    associating the MDN of the previously registered telematics unit with the Mobile Identification Number (MIN) and Electronic Serial Number (ESN) of the acquired telematics unit and associating the MDN of the acquired telematics unit with the MIN and ESN of the previously registered telematics unit by the wireless carrier; and
    reprogramming the MDN of the acquired telematics unit by the telematics service provider.

2. The method according to claim 1, further comprising accessing the subscriber's records from one or more databases by a telematics service provider; and analyzing subscriber's records to verify that the subscriber is an authorized user for the previously registered telematics unit and the acquired telematics unit.

3. The method according to claim 1, further comprising:
    accessing a cellular network database containing the cellular information of the subscriber's previously registered telematics unit and acquired telematics unit; and
    modifying the cellular information such that the MDN of the subscriber's previously registered telematics unit is associated with the MIN and ESN of the subscriber's acquired telematics unit.

4. The method according to claim 1, further comprising:
    accessing a billing database containing billing records of the subscriber's previously registered telematics unit and acquired telematics unit; and modifying the billing records such that the MDN of the subscriber's previously registered telematics unit is associated with the MIN and ESN of the subscriber's acquired telematics unit.

5. The method according to claim 1, further comprising reprogramming the MDN of the acquired telematics unit by a telematics unit across a wireless network using one or more software applications implemented by one or more telematics service provider servers.

6. The method according to claim 1, further comprising: accessing subscriber's record information from one or more databases; and modifying the subscriber's record information by a telematics service provider to record that the MIN and ESN of the subscriber's acquired telematics unit is associated with the MDN of the subscriber's previously registered telematics unit.

7. The method according to claim 5, wherein the wireless network is selected from the group consisting of wireless wide area networks, wireless metropolitan area networks, wireless local area networks, CDMA2000, Evolution Data Optimized (EVDO), High Speed Downlink Packet Access (HSDPA), GSM, WiFi, and WiMAX networks.

8. A system for switching Mobile Directory Numbers (MDNs) of an acquired telematics unit and a previously registered telematics unit, the system comprising:
   an acquired telematics unit by a telematics subscriber containing an MDN, Mobile Identification Number (MIN), and Electronic Serial Number (ESN);
   a previously registered telematics unit by a telematics subscriber containing an MDN, MIN, and ESN;
   a plurality of servers at a wireless carrier that implement a plurality of administrative software applications;
   a plurality of databases at the wireless carrier that store the wireless carrier's cellular network information and billing information;
   a plurality of servers at a telematics service provider that implement software applications that switch the MDN of an acquired telematics unit to the MDN of a previously registered telematics unit, wherein one or more software applications implemented by one or more servers at the telematics service provider receives a request from a subscriber to switch the MDN of the subscriber's previously registered telematics to the MDN of the subscriber's acquired telematics unit, verifies that the subscriber is an authorized user for both the previously registered telematics unit and the acquired telematics unit, and sends a request to a wireless carrier to associate the MDN of subscriber's previously registered telematics unit with the MIN and ESN of the subscriber's acquired telematics unit and to associate the MDN of the acquired telematics unit with the MIN and ESN of the previously registered telematics unit;
   a plurality of databases at a telematics service provider that store subscriber information; and
   a wireless network that communicates between a telematics unit, wireless carrier, and the telematics service provider.

9. A system according to claim 8, wherein one or more administrative software applications implemented by one or more servers at the wireless carrier receives a request from a telematics service provider to associate the MDN of subscriber's previously registered telematics unit with the MIN and ESN of the subscriber's acquired telematics unit.

10. A system according to claim 8, wherein one or more administrative software applications implemented by one or more servers at the wireless carrier:
   accesses a cellular network database containing cellular information of the subscriber's previously registered telematics unit and acquired telematics unit; and
   modifies the cellular information such that the MDN of the subscriber's previously registered telematics unit is associated with the MIN and ESN of the subscriber's acquired telematics unit.

11. A system according to claim 8, wherein one or more administrative software applications implemented by one or more servers at the wireless carrier:
   accesses a billing database containing billing records of the subscriber's previously registered telematics unit and acquired telematics unit; and
   modifies the billing records such that the MDN of the subscriber's previously registered telematics unit is associated with the MIN and ESN of the subscriber's acquired telematics unit.

12. A system according to claim 8, wherein one or more software applications implemented by one or more servers at the telematics service provider reprograms the MDN of the acquired telematics unit to the MDN of the subscriber's previously registered telematics device across a wireless network.

13. A system according to claim 8, wherein one or more software applications implemented by one or more servers at the telematics service provider:
   accesses the subscriber's telematics record information from one or more databases;
   modifies the subscriber's telematics record information such that the MDN of the subscriber's previously registered telematics unit is associated with the MIN and ESN of subscriber's acquired telematics unit.

14. The system according to claim 8, wherein the wireless network is selected from the group consisting of wireless wide area networks, wireless metropolitan area networks, wireless local area networks, CDMA2000, Evolution Data Optimized (EVDO), High Speed Downlink Packet Access (HSDPA), GSM, WiFi, and WiMAX networks.

* * * * *